United States Patent [19]
Küter et al.

[11] 3,858,069
[45] Dec. 31, 1974

[54] EXCITER ASSEMBLY FOR ELECTRIC MACHINES WITH REVOLVING RECTIFIERS

[75] Inventors: Heinrich Küter, Wattenscheid; Hans Lenting, Mulheim-Ruhr, both of Germany

[73] Assignee: Kraftwerk Union Aktiengesellschaft, Mulheim (Ruhr), Germany

[22] Filed: Mar. 9, 1973

[21] Appl. No.: 339,925

[30] Foreign Application Priority Data
Mar. 10, 1972  Germany............................ 2211810

[52] U.S. Cl. ............................... 310/68 D, 310/231
[51] Int. Cl. ............................................ H02k 9/04
[58] Field of Search........ 310/68 R, 68 D, 260, 270, 310/271, 71, 231, 219, 180, 199

[56] References Cited
UNITED STATES PATENTS
| | | | |
|---|---|---|---|
| 957,290 | 5/1910 | Wright | 310/270 |
| 2,519,219 | 8/1950 | Baudry et al. | 310/271 |
| 3,590,291 | 6/1971 | Spisak | 310/68 D |
| 3,723,794 | 3/1973 | Spisak et al. | 310/68 D |

FOREIGN PATENTS OR APPLICATIONS
1,473,610   3/1967   France............................ 310/68 D

*Primary Examiner*—J. D. Miller
*Assistant Examiner*—Harry E. Moose, Jr.
*Attorney, Agent, or Firm*—Herbert L. Lerner

[57] ABSTRACT

In an exciter assembly for electric machines, such as synchronous generators, the carrier wheel for the revolving rectifiers is formed of a disc-shaped hub having disposed on both sides and at the periphery thereof, light-metal rings which are insulatedly threadedly secured to the hub and by shoulders or extensions overlapping the outer hub periphery, are shrinkfitted on the hub. Each of the light-metal rings, which forms a direct current pole, carries rectifier diodes, that are directly threadedly secured to the respective ring, as well as insulatedly fastened fuses.

12 Claims, 6 Drawing Figures

EXCITER ASSEMBLY FOR ELECTRIC MACHINES WITH REVOLVING RECTIFIERS

The invention relates to an exciter assembly for electric machines, especially for synchronous generators, wherein an exciting current is fed from the armature of an alternatingcurrent exciter machine through revolving rectifiers to the exciter winding of the electric machine or generator. The revolving rectifiers are supported on a carrier wheel mounted on the shaft of the generator.

For the constructional development of such carrier wheels and the disposition of the rectifiers and fuses on these carrier wheels, difficulties are encountered for machines having large shaft diameters. This is true especially when the generator, for example, is to be driven at both ends thereof, for example additionally by a gas turbine at the free end of the generator shaft. In such a case, an additional coupling must be provided at that end of the shaft and must have a relatively large radial extent, and accordingly also requires a relatively large diameter of the carrier wheel for the revolving rectifiers.

It is an object of the invention to provide an exciter assembly for electric machines having a relatively simple constructions for the entire exciter machine and which is very compact yet relatively light in weight.

With the foregoing and other objects of the invention in view, there is provided an exciter assembly for an electric machine, such as a synchronous generator having a rotary shaft and an exciter winding, comprising an alternating-current exciter machine having an armature, a plurality of revolving rectifiers connectible between the armature and the exciter winding of the electric machine for feeding exciting current thereto, and a carrier wheel for the revolving rectifiers securable to the shaft of the electric machine, the carrier wheel comprising a disc-shaped hub, a pair of light-metal rings respectively mounted on both sides of the disc-shaped hub at the periphery thereof, the light-metal rings being insulated from and threadedly secured to the hub and, by means of respective shoulders overlapping the periphery of the hub, being shrink-fitted on the hub, each of the light-metal rings forming a direct-current pole carrying rectifier diodes that are directly threadedly secured thereto, and fuses insulatedly fastened thereto. Through this construction of the carrier wheel, there is provided a symmetric structure favorable for centrifugal forces that develop, and which is relatively light in weight and requires only a slight axial construction length.

In accordance with other features of the invention, and for supplying multiphase or three-phase current to the individual diodes, the pressure ring of the armature of the alternating-current exciter machine that faces toward the rectifier carrier wheel, is provided with a ring conductor system to which the connectors of the multiphase current winding extend. This ring conductor system is connected to the rectifier diodes through connecting members inserted in grooves at the shaft periphery. Accordingly, special multiphase current distributor lines at the carrier wheel proper are dispensed with. To secure these connecting members, they are retained by an insulated shrinkfitted ring. This ring is connected to the zero or neutral point of the multiphase current winding and serves as slip ring for monitoring grounding.

In accordance with a further feature of the invention, the exciter assembly includes, respectively, a rectifier diode and a respective fuse therefor which are disposed adjacent one another in peripheral direction on the inner periphery of the respective light-metal ring, the rectifier diode having a radially inwardly extending connector, and the fuse having a radially outwardly extending connector, and a strap connecting the inwardly extending connector of the rectifier diode to the outwardly extending connector of the fuse.

In accordance with additional features of the invention, two diodes or two fuses, respectively, are disposed in mutual alignment on both sides of the hub.

In accordance with an added feature of the invention, two fuses, respectively, are located opposite one another and have respective radially inwardly extending connectors, and including a bolt extending through the hub and connecting the inwardly extending connectors to one another. Simultaneously, these bolts are connected to the multiphase current produced in the exciter rotor or armature.

In accordance with yet another feature of the invention, to reduce the voltage peaks, a plurality of circuit blocks having a respective series circuit including capacitance and resistance are connected between both of the direct-current poles, the circuit blocks extending through openings in the hub and being supported, respectively, on both of the light-metal rings.

In accordance with a concomitant feature of the invention, direct-current supply leads in the form of bus bars are extensible through a bore formed in the shaft of the electric machine or generator and connected to respective bolts extensible through opposing radial bores formed in the machine shaft, the bolts, respectively, being connected by connector members to the direct-current poles.

Other features which are considered as characteristic for the invention are set forth in the appended claims.

Although the invention is illustrated and described herein as embodied in exciter assembly for electric machines with revolving rectifiers, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings, in which.

Figure 2:
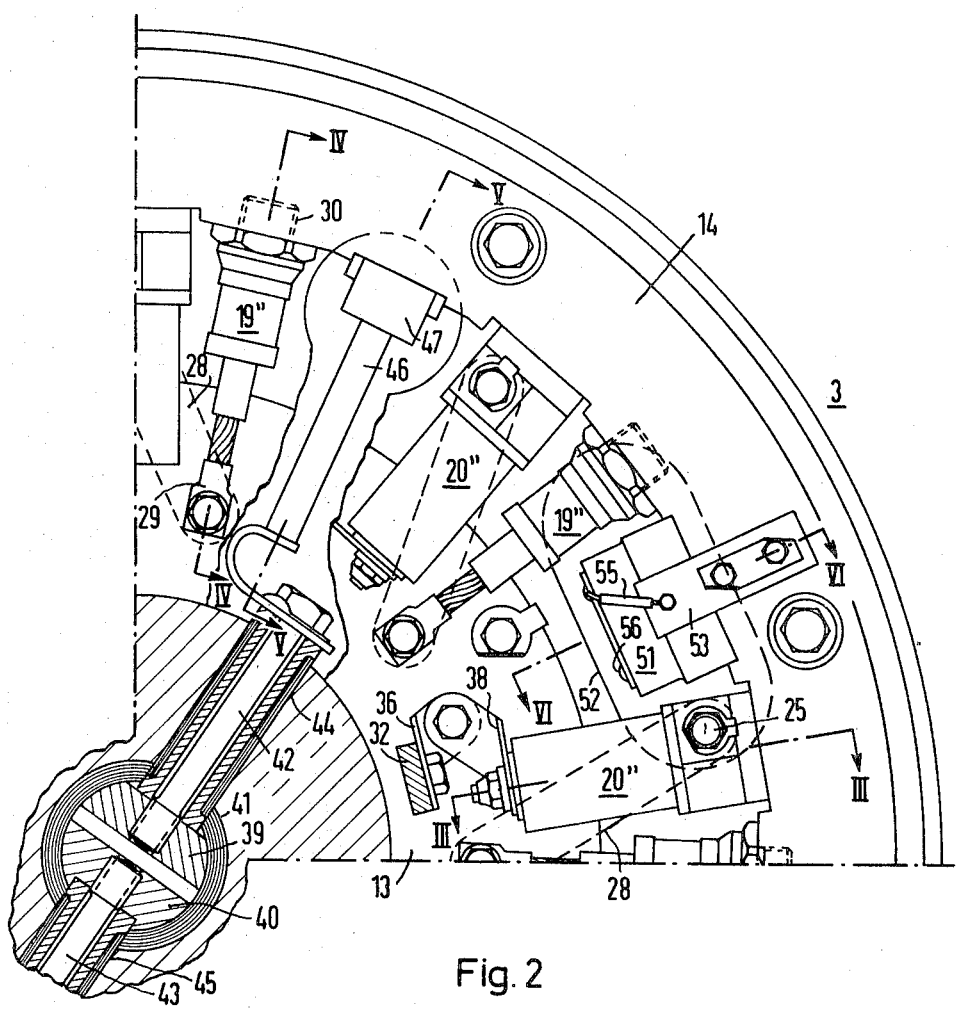
FIG. 2 is a cross-sectional view of a quarter sector of the rectifier carrier wheel of the invention shown in FIG. 1 taken along the line II—II in the direction of the arrows.
Figure 5:
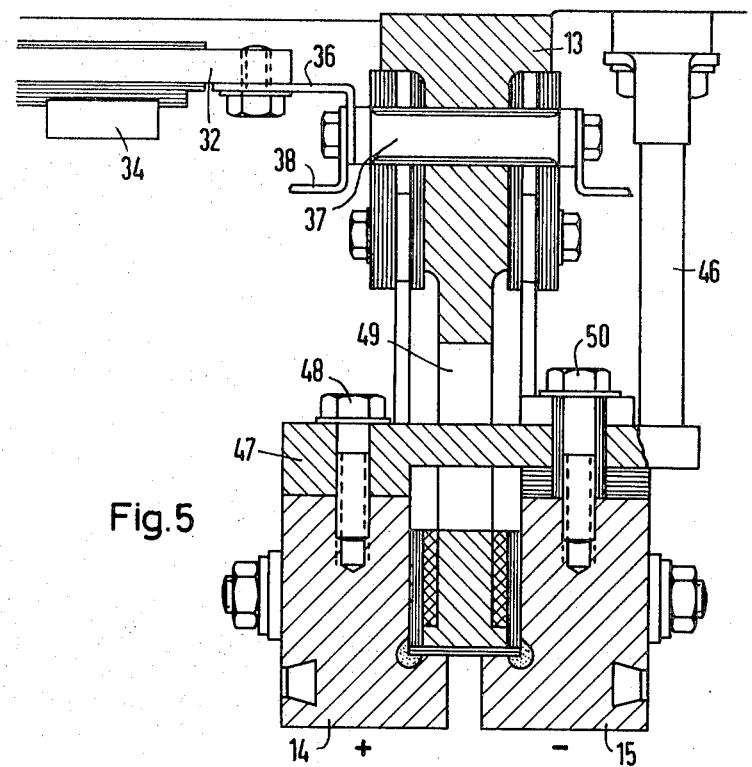
Figure 6:
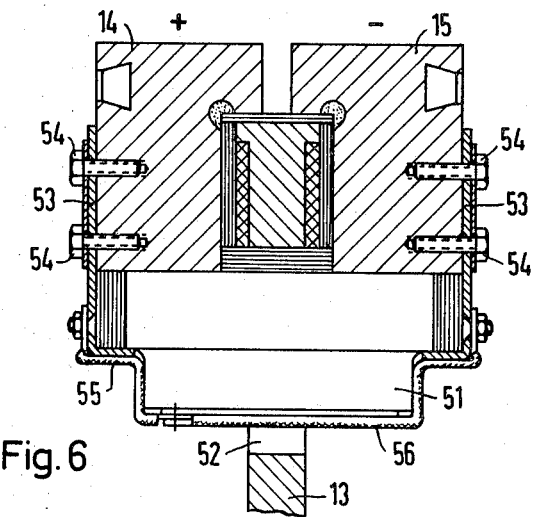

FIG. 5 is another radially extending longitudinal sectional view of FIG. 2, taken, however, along the line V—V in the direction of the arrows and showing the rectifier carrier wheel in the vicinity of the current conductors for the exciter machine and the direct-current conductors; and FIG. 6 is a partial radially extending longitudinal sectional view of FIG. 2 taken along the line VI—VI in the direction of the arrows and showing the rectifier carrying wheel at a location of a circuit block thereon.

Figure 1:
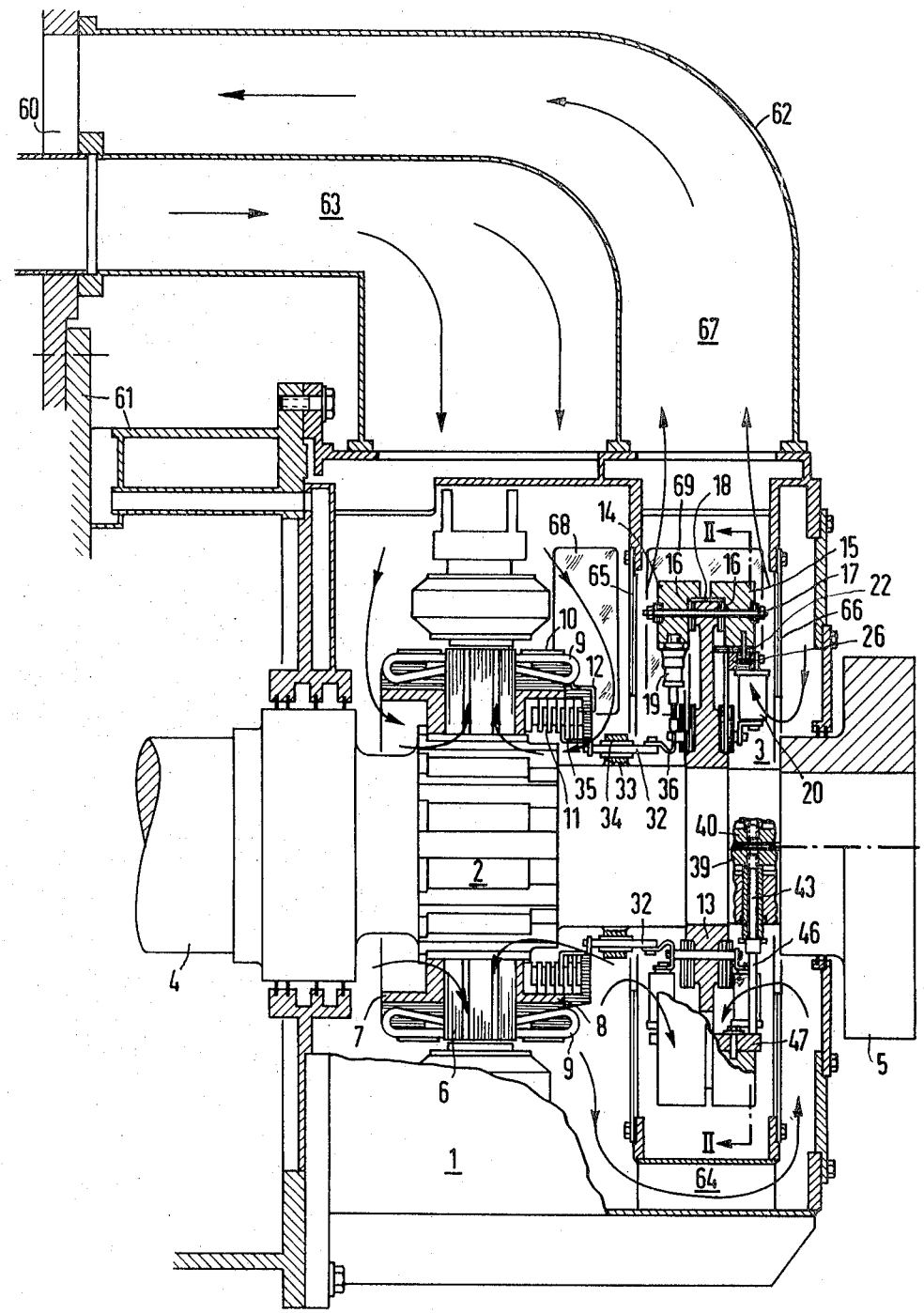
FIG. 1 is a longitudinal sectional view of an exciter assembly for a synchronous generator constructed in accordance with the invention.

Referring now to the drawing, and first, particularly, to FIG. 1 thereof, there is shown therein in longitudinal section the exciter end of a synchronous generator, the exciter machine 1 of the invention being particularly suited for attachment to air-cooled generators of the bearing end plate type of construction. In such constructions, the rotating parts i.e. the exciter rotor or armature 2 and the rectifier carrier wheel 3, are mounted on one end of the generator shaft 4 beyond the support bearing for the shaft 4. The end of the generator shaft 4 can be so constructed that, beyond the exciter machine 1, a coupling can be mounted on that end of the shaft 4 so that a drive for the generator, such as an additional gas turbine, can be provided at that end in addition to the drive conventionally provided at the non-illustrated end of the shaft 4.

The exciter rotor or armature 2 is formed in a conventional manner of dynamo or core plates 6 which are held together pre-stressed by non-illustrating clamping bolts and by light-metal pressure rings 7 and 8 located at both sides thereof, respectively. An armature or multiphase current winding is located in grooves suitably provided at the outer diameter of the core plate packet and has relatively short end-winding overhangs 9. The winding heads 9 are supported on the pressure rings 7 and 8 and are held at the outside thereof by bands 10. Within that pressure ring 8 facing the rectifier carrier wheel 3, there is provided a ring conductor system 11 to which winding connectors 12 of the multiphase current winding are connected.

The rectifier carrier wheel 3 is formed, in accordance with the invention, of a disc-shaped hub 13, which is shrinkfitted or press-fitted on the generator shaft 4. At the outer periphery of the hub 13, two rings 14 and 15 of light metal are located. The rings 14 and 15 are separated by insulating layers 16 from the hub 13 and are threadedly connected to the hub 13 by bolts 17. The two rings 14 and 15, respectively, have shoulders or projections which overlap the outer periphery of the hub 13 and, by means of which, the rings 14 and 15 are shrink-fitted on the hub 13, separated, if necessary by an insulating layer 18. The rings 14 and 15 carry, respectively, a group of diodes 19 and fuses 20, the diodes 19 being directly screwed into the respective ring, and the fuses 20 secured to the respective ring through connector members 26 and insulating layers 22.

In its entirety, the rectifier carrier wheel 3, as can also be readily determined from the cross-sectional view of FIG. 2, carries eighteen diodes in a multiphase current bridge circuit, wherein, respectively, three diodes are connected in parallel. All of the diodes have the same dimensions but nevertheless have different directions of transmission and, accordingly, form two groups.

Figure 3:
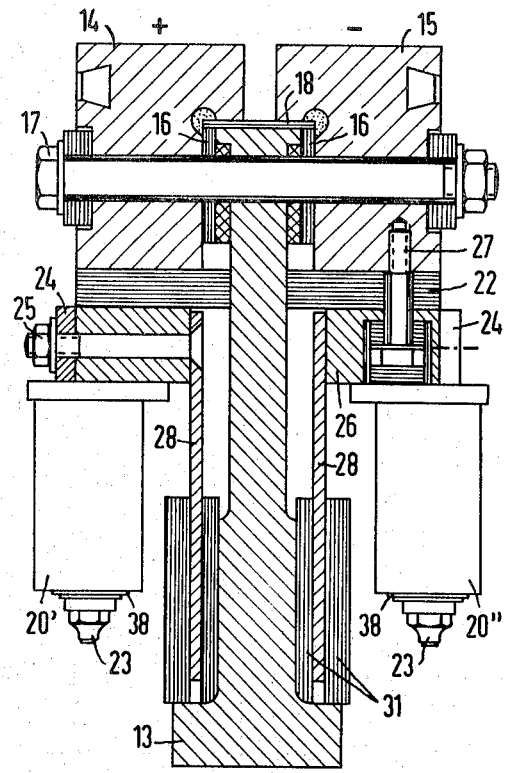
FIG. 3 is a radially extending longitudinal sectional view of FIG. 2 taken along the line III—III in the direction of the arrows and showing the rectifier carrier wheel with two fuses.
Figure 4:
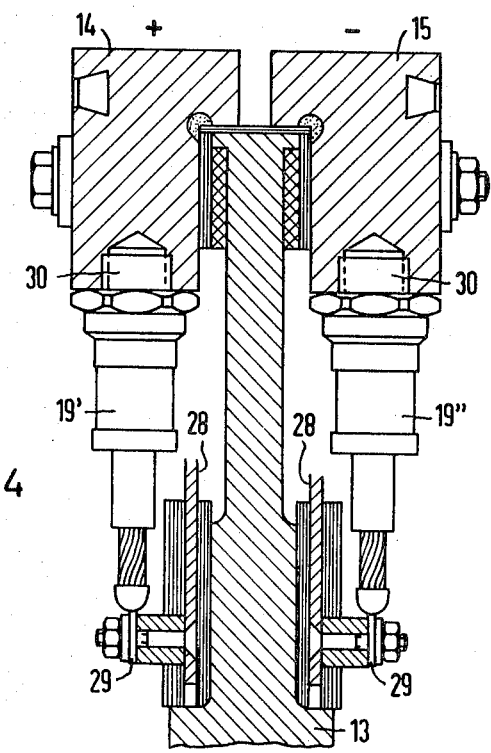
FIG. 4 is a corresponding radially extending longitudinal sectional view of FIG. 2 taken along the line IV—IV in the direction of the arrows and showing the rectifier carrier wheel with two rectifier diodes.

As is apparent from the cross-sectional view of FIG. 2 and the radially extending longitudinal sectional view of FIG. 3, two fuses 20' and 20" are disposed, respectively, in axial alignment on both sides of the hub 13. The fuses 20 have, respectively, a lower connector 23 for supplying the respective multiphase or three-phase current, as explained more fully hereinafter. At the radially outwardly located end thereof, the fuses 20 have connector bridges 24 through which they are threadedly secured to the respective connector members 26 by bolts 25, the connector members 26 being, in turn, threadedly secured through insulatedly guided screws 27 to the respective light-metal ring 14 or 15. From the other end of the bolts 25, at the radially outwardly located fuse connector 24, straps 28 extend to the radially inwardly located connector 29 of the adjacent diodes 19' and 19", as is readily apparent from FIG. 4. These diodes 19' and 19" are threadedly secured by a screw thread 30 directly into the respective rings 14 and 15. Also, respectively, two rectifier diodes 19' and 19" are thereby disposed in axial alignment opposite one another on both sides of the hub 13. The connecting straps 28 are separated by insulating layers 31 from the hub 13.

To feed the multiphase, such as three-phase, current to the individual fuses and diodes, connector members 32, as shown in FIG. 1, are provided, and extend, insulated in grooves formed in a ring-shaped extension or appendage 33 of the generator shaft 4, and between the exciter machine 1 and the rectifier carrier wheel 3. An insulated shrink-fitted ring 34 retains the connector members 32 in the grooves. The ring 34 is connected to the zero or neutral point of the winding and serves simultaneously as measuring slip ring so that exciter and generator rotor or armature can be tested or inspected at ground potential. The connector members 32 are firmly connected on one side thereof by feed lines 35 to the ring conductor system 11 of the exciter rotor or armature 2, and on the other side thereof threadedly connected to the connectors 36 of the rectifier carrier wheel 3. These feed lines 36, as is seen especially from the radially extending longitudinal section of FIG. 5, extend to a bolt 37 passing through the hub 13, the bolt 37 interconnecting through straps 38 the radially inwardly extending connectors 23 of pairs of oppositely disposed fuses 20.

Through the corresponding interconnection of the rectifier diodes 19' and 19", which are not further detailed in the drawings, both of the rings 14 and 15, which carry the diodes, thus also form the corresponding direct-current poles. The feed line of the direct current to the exciter winding of the synchronous generator rotor is effected through two bus bars 39 and 40 extending through an axial bore 41 formed in the generator shaft, as shown in FIGS. 1 and 2. Through two suitably insulatedly guided bolts or pins 42 and 43 disposed in two opposing radial bores 44 and 45 formed in the generator shaft, and through corresponding radially extending connector members 46, the direct current from both rings 14 and 15 is conducted to the generator rotor or armature. The connection of the individual rings is also seen in FIG. 5, wherein a coaxially extending connector member 47 is firmly connected through a screw 48 with the ring 14 on the left-hand side of FIG. 5, and extends through an opening 49 in the hub 13 of the rectifier carrier wheel 3 to the radially extending connector member 46. On the other side of the hub 13, this connector member 47 is connected through an insulatedly guided screw 50 also with the other ring 15. The conduction or shunting of the direct current from the ring 15 is effected in a similar manner from the opposite side of the machine and is therefore no further described herein.

To reduce voltage peaks, which are produced by the carrier blocking effect, three circuit blocks 51 including respectively a capacitor and a resistance in series connection are installed in the carrier wheel. As is apparent especially from the sectional view of FIG. 6, these circuit blocks 51, that are shown only schematically in the Figure, are connected between both of the rings 14 and 15 which act as direct-current poles. The circuit blocks 51 extend radially inwardly of the two rings 14 and 15 and pass through openings 52 formed in the hub 13. As a holder and electrical connection, there is provided, respectively, a strap 53 on the outside, which partly surrounds the respective circuit block 51 at the outer edge thereof and thereby holds it firmly. The straps 53 are firmly connected through screws 54 with both rings 14 and 15. Furthermore, at the radially inner end of these straps 53, leads 55 and 56 are secured which provide an electrical connection from the rings 14 and 15 to the circuit block 51. The orientation of the connecting lines 55 and 56 is especially apparent when viewed from the side shown in FIG. 2.

The cooling of the electric machine is also seen from FIG. 1. The exciter machine 1 is air-cooled, the cooling air being drawn from a pressure chamber in the generator and traversing successively the exciter section 1 and the rectifier section 3, and then recirculated to the generator. With auxiliary associated arrows, the course of the air flow is shown more clearly in FIG. 1. To guide the cooling air, an easily removable connecting pipe 62 having channels for supplying fresh air and discharging spent air is located between the merely schematically indicated upper part 60 of the generator and the generator bearing end plate 61. The supplied air flows through the radially inwardly extending channel 63 from the non-illustrated pressure chamber of the generator into the region of the exciter machine 1 and flows through the pole gaps and the exciter rotor or armature 2 in direction to the rectifier section 3. The shaft 4 is provided in the region of the exciter rotor 2 with longitudinal grooves, wherefrom part of the air flows radially outwardly through slits in the core plate packet 6 and through grooves between the packet 6 and the pressure rings 7. Due to the symmetrical construction of the rectifier carrier wheel 3, cooling air must be supplied thereto from both sides thereof. Therefore, the cooling air is delivered through channels 64 provided in the lower part of the housing, as viewed in FIG. 1, also to the radially outer side of the rectifier carrier wheel 3. To guide the cooling air, circular plates 65 and 66 are located on both sides of the rectifier wheel 3 so that the cooling air is sucked in at the region of the shaft periphery and expelled radially outwardly. Since the diode carrier rings 14 and 15 are formed of light metal having good thermal conductivity and are traversed on all sides by air, intensive cooling of the diodes 19 is achieved because of the large ring surface. Above the rectifier wheel 3, the air then flows through the spent air channel 67 of the connecting pipe 62 back to the generator.

To observe or monitor the space or region occupied by the exciter machine and the rectifier diodes one or more windows 68 and 69, which may be of Plexiglas, for example, are provided on the one side of the housing so that the fuses 20 on the rectifier carrier wheel 3, which are provided with good visible characteristic indicators, can be illuminated at any time through the windows with stroboscope lamps and controlled.

We claim:

1. Exciter assembly for an electric machine, such as a synchronous generator having a rotary shaft and an exciter winding, comprising an alternating-current exciter machine having an armature, a plurality of revolving rectifiers connectible between said armature and the exciter winding of the electric machine for feeding exciting current thereto, and a carrier wheel for said revolving rectifiers securable to the shaft of the electric machine, said carrier wheel comprising a disc-shaped hub, a pair of light-metal rings respectively mounted on both sides of said disc-shaped hub at the periphery thereof, said light-metal rings being insulated from said hub and secured to said hub by a bolt and by means of respective shoulders overlapping the periphery of said hub, and being shrink-fitted on said hub, each of said light-metal rings forming a direct-current pole carrying rectifier diodes that are directly threadedly secured thereto, and fuses insulatedly fastened to said rings.

2. Exciter assembly according to claim 1, wherein said alternating-current exciter machine includes a pair of pressure rings retaining core plates for a multiphase current winding on said armature, one of said pressure rings facing toward said carrier wheel and having a ring conducting system to which said multiphase current winding is connected, said conducting system being further connected to said rectifiers through connecting members received in grooves formed at the periphery of the shaft of said electric machine.

3. Exciter assembly according to claim 1, wherein, respectively, a rectifier diode and a respective fuse therefor are disposed adjacent one another in peripheral direction on the inner periphery of the respective light-metal ring, said rectifier diode having a radially inwardly extending connector, and said fuse having a radially outwardly extending connector, and a strap connecting said inwardly extending connector of said rectifier diode to said outwardly extending connector of said fuse.

4. Exciter assembly according to claim 1, wherein two fuses are disposed in mutual alignment on both sides of said hub, respectively.

5. Exciter assembly according to claim 1, wherein two diodes are disposed in mutual alignment on both sides of said hub, respectively.

6. Exciter assembly according to claim 1, wherein two fuses, respectively, are located opposite one another and have respective radially inwardly extending connectors, and including a bolt extending through said hub and connecting said inwardly extending connectors to one another.

7. Exciter assembly according to claim 1, wherein said exciter machine includes a multiphase current winding on said armature thereof, and a respective plurality of connectors successively disposed in peripheral direction of said hub and being connected with one phase connection of said multiphase current winding.

8. Exciter assembly according to claim 1, wherein, to reduce the voltage peaks, a plurality of circuit blocks having a respective series circuit including capacitance and resistance are connected between both of said direct-current poles, said circuit blocks extending through openings in said hub and being supported respectively on both of said light-metal rings.

9. Exciter assembly according to claim 1, wherein said armature and said direct-current carrier wheel are mounted on an end of the electric machine shaft at a location beyond a bearing support for the shaft.

10. Exciter assembly according to claim 9, wherein the end of the electric machine shaft has a further coupling for driving the electric machine from that end as well as from the other end thereof.

11. Exciter assembly according to claim 9, wherein the electric machine is a generator, and said exciter machine and said rectifier wheel are cooled by cool air supplied from a pressure chamber located in the generator.

12. Exciter assembly according to claim 11, wherein said housing has an upper part and, between said upper housing part and a bearing end plate of the generator, there is disposed a removable connecting pipe having channels therein for supplying fresh cooling air to and removing spent cooling air from said exciter machine and said rectifiers.

* * * * *